United States Patent [19]

Miller et al.

[11] 4,043,615
[45] Aug. 23, 1977

[54] THRUST BEARING LOCATING DEVICE AND A METHOD FOR LOCATING A THRUST BEARING WITHIN A TURBINE CASING

[75] Inventors: Lewis J. Miller, Nether Providence; Casimir M. Klarman, Folsom, both of Pa.

[73] Assignee: Westinghouse Electric Corporation, Pittsburgh, Pa.

[21] Appl. No.: 620,440

[22] Filed: Oct. 7, 1975

[51] Int. Cl.² ............................................. F16C 23/00
[52] U.S. Cl. .................................................... 308/32
[58] Field of Search .................... 308/219, 27, 32, 36, 308/219

[56] References Cited

U.S. PATENT DOCUMENTS

| | | | |
|---|---|---|---|
| 2,321,329 | 6/1943 | Stafford et al. | 308/32 |
| 2,530,520 | 11/1950 | Hackethal | 308/219 |
| 2,568,433 | 9/1951 | Daly | 308/219 |
| 3,909,156 | 9/1975 | Stahl | 308/32 |

Primary Examiner—Richard A. Bertsch
Attorney, Agent, or Firm—F. J. Baehr, Jr.

[57] ABSTRACT

A device for positioning a thrust bearing with respect to a stationary element within an axial flow turbine apparatus. The device comprises a first threaded member disposed retractably within the stationary element and engaging the bearing to position the bearing vertically with respect to an axis extending through the turbine casing. A second threaded member is retractably positioned within the stationary element and abuts against the bearing to position the bearing at a point along the axis of the casing. A securing member extends through a portion of the bearing and engages the first threaded member to secure the bearing in the axial and vertical position within the stationary element. Suitable set screws are provided to maintain the positions of both the first and the second threaded members within the stationary element and the engagement of the securing member with the first threaded member.

3 Claims, 2 Drawing Figures

THRUST BEARING LOCATING DEVICE AND A METHOD FOR LOCATING A THRUST BEARING WITHIN A TURBINE CASING

BACKGROUND OF THE INVENTION

1. Field of the Invention

This invention relates to axial flow turbine apparatus, and in particular, to a positioning device for locating a thrust bearing with respect to a stationary portion of the turbine.

2. Description of the Prior Art

Rotatably disposed within a casing member of a turbine apparatus is a rotor shaft having mounted thereon a plurality of arrays of rotating blades. The rotating blades are axially interspaced in an alternating configuration with arrays of stationary blading depending from the interior of the casing. As is well known, motive steam is permitted to expand through the alternating arrays of rotating and stationary blades to convert the energy carried by the steam into rotational mechanical energy.

Located at one end of the rotor shaft and mounted in a stationary housing element within the casing is a thrust bearing member. The purpose of the thrust bearing is to act as the anchor point for the rotor and to take any variations in the thrust loading imposed on the rotor so that the desired position thereof can be maintained relative to the stationary blading arrays disposed within the casing. From the anchor point, the rotor is freed to expand axially as the temperatures of the motive steam upon it cause the rotor and the stationary parts to lengthen commensurately.

In erecting the turbine the rotor is installed within the cylinders and all mating surfaces therebetween are set and checked for proper clearances. In order to maintain these clearances, the thrust bearing is positioned on the rotor at the location thereof being designated as the anchor point for the rotor. This position of the thrust bearing with respect to the rotor must be maintained. Thrust bearings of the type used in the turbine art usually have outwardly extending flanges, or support feet, which extend from circumferentially opposite locations on the bearing member. The position of the support feet of the bearing, and therefore the bearing itself, is presently maintained within the bearing housing by an arrangement disposed on each of the oppositely extending support feet. The prior art arrangement includes wedges, liners, and a support cover. The prior art utilizes a complicated and complex fabrication and machining process in order to assure that the bearing member is located in a stationary position relative to the housing.

Once the support foot on each side of the thrust bearing member has been disposed within a corresponding groove provided in the housing so that the thrust bearing is in its required position on the anchor point of the rotor, an axial dimension from the thrust bearing support foot to the housing is obtained. A custom machined shim is installed into position axially intermediate the support foot and the housing on each side of the thrust bearing housing. The shim is held in place by a suitable locating bar secured by screws and lock washers. A support cover is then bolted into place by suitable screws so as to cover the support foot on each side of the bearing housing. A movable wedge disposed on the underside of the support foot is held in place between the underside of the support foot and the side of the groove within the housing while a locating bolt is screwed through the support cover and into the movable wedge. A corresponding wedge surface mounted on the support foot is then positioned next to the movable wedge and by adjusting the two wedges along their engaged surfaces the bearing support foot is located with respect to the axis of the casing. Once the wedges have been aligned any variation between the fixed shim and the axial side of the support foot is recorded so that variations in the shim may be custom machined and the shim redesigned to fit.

Once these preliminary dimensions have been taken and fittings between the corresponding parts made and match-marked, the support cover is removed so that the movable wedge is secured by a bolt and lock washer. The support cover is then replaced into position. The bolt which extends through both the support cover and movable wedge is locked into position through the use of a lock nut and a lock wire.

It is thus apparent that considerable time and effort is expended in both the custom machining and aligning of the various parts of the prior art locating mechanism and in the extensive operations which are required in order to accurately position the bearing member relative to the stationary housing element. It is apparent from the discussion of the prior art arrangement above, that parts must be match-marked to insure that the elements will always be assembled in the same location should the unit ever be disassembled. This of course necessitates extra expense in both labor and down time during reassembly. It is also noted that for the support location of each support foot, which extends from each side of the bearing member, the alignments of part and labor described above must occur twice.

It is evident that a more efficient and expeditious process of mounting the thrust bearing with respect to a stationary element within the casing and a more effective device for positioning the thrust bearing relative to the casing is necessary.

SUMMARY OF THE INVENTION

The thrust bearing positioning device embodying the teachings of this invention overcomes all of the aforementioned difficulties of the prior art. The device comprises a first pair of threaded members disposed within a casing which engage and locate each of the thrust bearing support feet vertically, with respect to an axis extending through the casing. A second pair of threaded members are disposed within the casing on each side of the support foot to engage and locate each of the bearing support feet at a point along the axis of the casing. A third means for securing the bearing support feet to the first locating members is provided. Each of the above-mentioned members has disposed thereon suitable access means for permitting the members to be advanced and retracted from their openings within the casing so as to variably locate the support foot relative to the casing. Provided also are locking means for securing the threaded members in position once the proper alignment of the bearing has been effected.

It is an object of this invention to provide a thrust bearing locating device which accurately aligns and secures a thrust bearing member with respect to a stationary element within the turbine casing without the use of prior art wedges, liners, support covers or the like. It is a further object of this invention to provide a thrust bearing locating device for locating the thrust bearing which is both simple to apply and efficient.

Other objects of the invention will be made clear in the following detailed description of the preferred embodiment.

BRIEF DESCRIPTION OF THE DRAWINGS

The invention will be more fully understood from the following detailed description of the preferred embodiment taken in connection with the accompanying drawings in which.

DESCRIPTION OF THE PREFERRED EMBODIMENT

Figure 2:
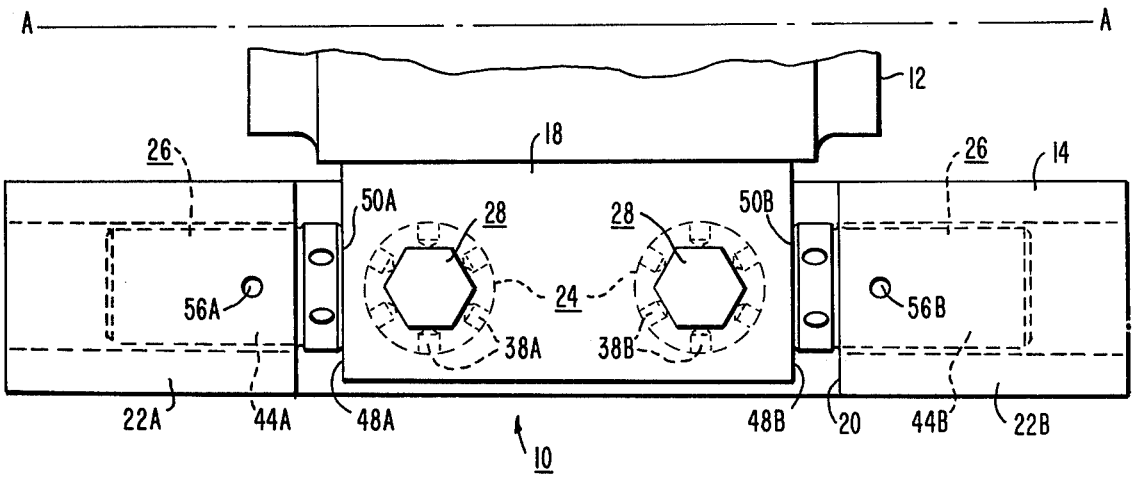
Figure 1:
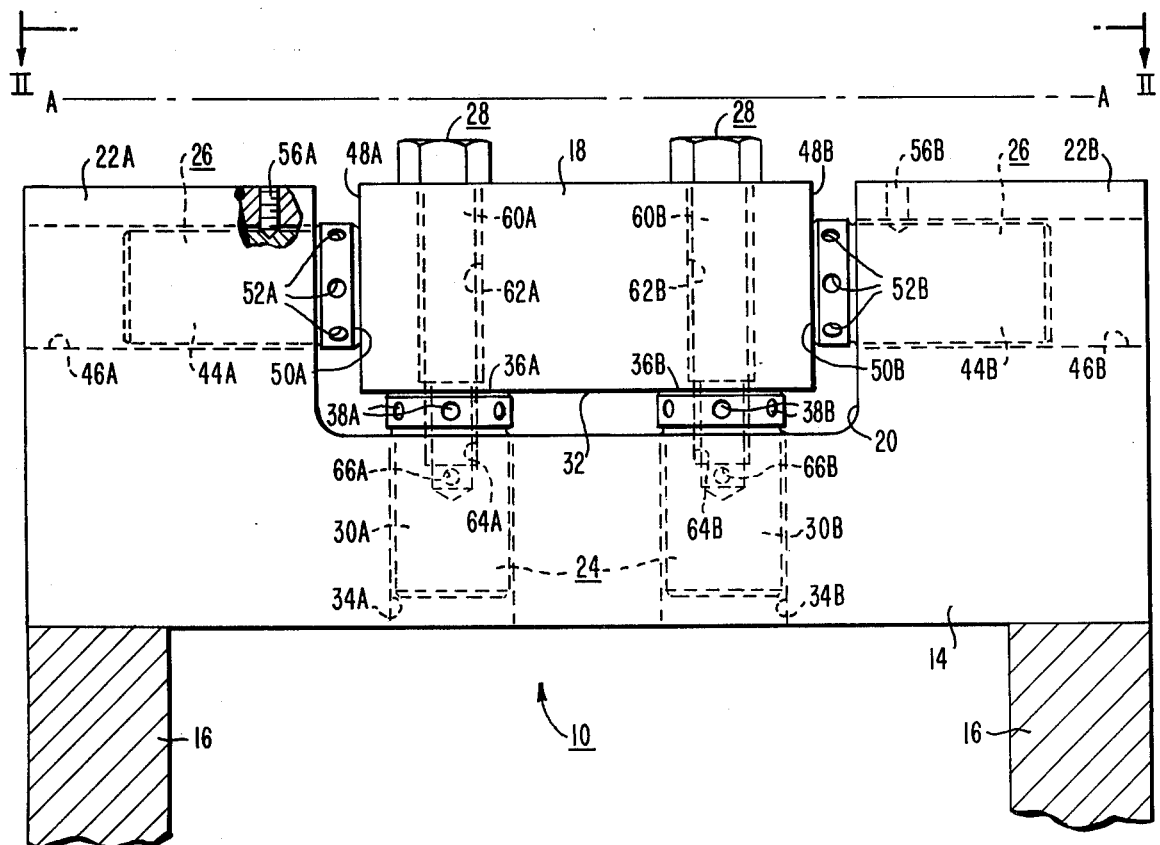
FIG. 1 is a side elevational view of a thrust bearing positioning arrangement embodying the teachings of this invention; and, FIG. 2 is a plan view of the thrust bearing positioning arrangement taught by the invention taken along lines II—II of FIG. 1.

Throughout the following description, similar reference numerals refer to similar elements in both figures of the drawings. Referring to FIGS. 1 and 2, an elevation and a plan view, respectively, of a thrust bearing positioning arrangement generally indicated by reference numeral 10 and embodying the teachings of this invention is shown as locating a thrust bearing member 12 and bearing housing 14 in position relative to casing within an axial flow steam turbine apparatus. The thrust bearing housing 14 is supported from a turbine casing 16. The casing 16 surrounds and supports a turbine rotor member which has an axis of rotation A—A extending therethrough.

As seen the thrust bearing housing 14 has, at opposite locations thereon, outwardly extending support feet 18. The support feet 18 on each side of the bearing housing 14 is received within suitably sized grooves 20 provided within the casing 16, the grooves 20 being defined by lands 22A and 22B. As will be explained more fully herein, the positioning arrangement embodying the teachings of this invention locates and maintains each of the support feet 18 extending outwardly from each side of the bearing housing 14 in position relative to the casing 16.

Since the positioning arrangement 10 embodying the teachings of this invention is identical when utilized to position the support foot 18 extending from either side of the bearing housing 14, the description herein will describe the positioning arrangement utilized in connection with only one support foot 18. It is understood of course that a positioning arrangement embodying the teachings of this invention may also be utilized in any situation requiring both the vertical or transverse and axial positioning and position maintainance of a device relative to a stationary member.

In general, the positioning arrangement embodying the teachings of this invention comprises first means, generally indicated by reference numeral 24, for engaging and transversely locating the bearing support foot 18 with respect to the axis of rotation A—A. Second means, generally indicated by reference numeral 26, for engaging and locating the bearing support foot 18 axially with respect to the axis A—A and relative to the casing 16 are provided. Third means, generally indicated by reference numeral 28, are provided for engaging both the support foot 18 and the first means 24 to secure the bearing housing, as positioned by the first means 24 transversely and the second means 26 axially, in position relative to the casing 16.

As best seen in FIG. 1, the first means 24 for positioning the bearing foot 18 transversely with respect to the axis A—A extending through the turbine casing 16 comprise a first and a second threaded bolt, 30A and 30B, respectively, located beneath the lower face 32 of the support foot 18. The bolts 30A and 30B are each retractably disposed within a threaded opening 34A and 34B provided within the casing 16. The bolts 30A and 30B each terminate in suitable contact faces 36A and 36B which are adapted to engage the lower surface 32 of the support foot 18. Suitable access means, such as a plurality of holes 38A and 38B are provided in each of the bolts 30A and 30B in a radial manner, with respect to an axis extending through the bolts 30A and 30B.

The second means 26 for axially positioning the support foot 18 comprises a first threaded bolt 44A and a second threaded bolt 44B retractably located within openings 46A and 46B disposed respectively in the lands 22A and 22B located adjacent disposed faces 48A and 48B perpendicular to the axis A—A on the foot 18. Similar to bolts 30A and 30B, bolts 44A and 44B terminate in contact faces 50A and 50B adapted to engage the faces 48A and 48B, and are also provided with access means, generally indicated at 52A and 52B, which include a plurality of access holes radially extending in each of the bolts 44A and 44B with respect to an axis therethrough.

Readily understandable from reference to the drawings is the method of insertion and positioning of the support feet 18 with respect to the casing 16 utilizing the arrangement embodying the teachings of this invention. Prior to the insertion of the support feet 18 into the groove 20 defined within the casing 16, bolts 30A and 30B, as well as bolts 44A and 44B, are displaced within their respective sets of openings 34 and 46 within the casing 16. The bolts are displaced by the use of their respective access means 38 and 52 so that the bolts 30 and 44 occupy their fully retracted positions within their respective openings. Such complete retraction of the positioning bolts 30 and 44 permit the thrust bearing feet 18 to be inserted into the mating groove 20 with a suitable clearance with the surface 32 of the support foot 18 resting on surfaces 36.

Once the foot 18 is inserted, the foot 18 is positioned vertically or laterally with respect to the axis A—A. In FIG. 1, of course, a transverse variation is depicted as in the vertical direction. To vertically or transversely position the support foot 18, the bolts 30A and 30B are advanced from their openings 34A and 34B by the engagement of the access means 38A and 38B with a suitable tool. The bolts 30 are advanced with the contact faces 36A and 36B engaging and abutting against the lower surface 32 of the support foot 20. As the bolts 30A and 30B are advanced from their openings 34A and 34B, the support foot 18 and hence, the bearing housing 14 is raised relative to the casing 16 until it occupies its appropriate vertical position with respect to the axis A—A.

With the foot 18 properly positioned in its vertical location relative to the axis A—A by the first means 24, the foot 18 is be appropriately positioned at its predetermined axial location relative to the axis A—A. The bolt 44A is threadedly advanced within its respective opening 46A by engagement of the suitable tool with the access means 52A until the bolt contact surface 50A abuts against the face 48A of the support foot 18. With the engagement extant, the bolt 44A is advanced until the predetermined axial location of the foot 18 is achieved. In a similar manner, the second of the bolts 44B is advanced until the face 50B on the bolt 44B abuts the face 48B on the foot 18 to further aid and assist the first bolt 44A to secure the foot 18 in it desired axial position.

In order to maintain the bolts 44A and 44B in position within their openings 46A and 46B, set screws 56A and 56B are provided, the screws 56 passing through the lands 24A and 24B to engage the bolts 44 to maintain the bolts at their desired positions within the openings 46.

The third means 28 for maintaining the foot 18 in position comprises a pair of elongated bolts 60A and 60B which extend through registered openings 62A and 62B and 64A and 64B provided in the foot 18 and in the bolts 30, respectively. Once the foot 18 is raised to its predetermined transverse or vertical position, as described above, by the bolts 30 (which comprise the means 24), the bolts 30A and 30B are reamed to provide the openings 64A and 64B therein, the predrilled openings 62A and 62B in the foot 18 serving as a drill jig for this operation. The bolts 60A and 60B are then inserted through the registered openings 62 and 64 and secured threadedly therein. In order to guarantee security, set screws 66A and 66B are provided to maintain the relationship between the bolts 30 and 60, and also to maintain bolts 30 in their desired locations within the openings 34.

It may be appreciated from the foregoing description that the positioning device embodying the teachings of this invention provides advantages not attainable by the prior art device and eliminates all the inherent drawbacks of that system. Further, savings in both time and money during both erection and assembly and repair of the apparatus in addition to the added reliability of the fewer mechanical parts required by the invention disclosed herein provides a decided advantage over the positioning devices of the prior art.

We claim:

1. In an axial flow turbine apparatus having a casing with an axis extending therethrough and having a rotor mounted for rotation therewithin, a thrust bearing member supporting said rotor in a position within said casing, wherein the improvement comprises a device for positioning said thrust bearing within said casing, said device comprising;
    a first pair of threaded bolts displaceably mounted, one bolt of said first pair on each side of said axis, within said casing, said first bolts bearing against and engaging opposite sides of said bearing member and having access means on said first bolts for displacing said bolts relative to said casing to vary the transverse location of said bearing relative to said axis;
    a second pair of bolts displaceably mounted, one bolt of said second pair on each side of said axis, within said casing, said second bolts bearing against and engaging opposite sides of said bearing member and having access means on said second bolts for displacing said second bolts relative to said casing to vary the axial location of said bearing relative to said casing; and
    a third pair of bolts one bolt of said third pair on each side of said axis, said third bolts passing through said bearing member and being threaded into said first bolts to secure said bearing in an adjusted axial and transverse position and to lock said first bolts and said bearing in place within said casing.

2. The turbine of claim 1 and further comprising a fourth pair of bolts displaceably mounted, one bolt of said fourth pair on each side of said axis, within said casing, said fourth bolts bearing against and engaging opposite sides of said bearing member and directly opposing said second pair of bolts and having access means on said fourth bolts for displacing said bearing axially and cooperating with said second bolts to axially fit the position of said bearing.

3. The turbine of claim 1 and further comprising a fifth pair of bolts one bolt of said fifth pair being disposed on each side of said axis adjacent said first bolt.

* * * * *